(12) United States Patent
Kezuka et al.

(10) Patent No.: US 6,331,256 B1
(45) Date of Patent: *Dec. 18, 2001

(54) TREATMENT PROCESS FOR FLUORINE-CONTAINING WATER

(75) Inventors: Satoshi Kezuka; Takayuki Sadakata, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/246,706

(22) Filed: Feb. 9, 1999

(30) Foreign Application Priority Data

| Apr. 22, 1998 | (JP) | ................................. | 10-112228 |
| Apr. 27, 1998 | (JP) | ................................. | 10-117155 |
| Dec. 8, 1998 | (JP) | ................................. | 10-348586 |
| Dec. 8, 1998 | (JP) | ................................. | 10-348683 |

(51) Int. Cl.$^7$ .................................................... C02F 1/52
(52) U.S. Cl. ........................ 210/712; 210/713; 210/805; 210/915
(58) Field of Search ..................... 210/650, 651, 210/712, 713, 723, 724, 726, 805, 915

(56) References Cited

U.S. PATENT DOCUMENTS

| 4,008,162 | * | 2/1977 | Korenowski et al. | .................. 210/45 |
| 4,171,342 | * | 10/1979 | Hirko et al. | ......................... 423/160 |
| 4,698,163 | * | 10/1987 | Zibridaq | ............................... 210/724 |
| 5,043,072 | * | 8/1991 | Hitotsuyanagi et al. | ............ 210/638 |
| 5,106,509 | * | 4/1992 | Jansen | ................................... 210/715 |
| 5,702,594 | * | 12/1997 | Yamasaki et al. | .................... 210/151 |

FOREIGN PATENT DOCUMENTS

| 4-371292 | 12/1992 | (JP) . |
| 5-253576 | 10/1993 | (JP) . |
| 8-197070 | 8/1996 | (JP) . |

* cited by examiner

Primary Examiner—Betsey Morrison Hoey
(74) Attorney, Agent, or Firm—Armstrong, Westerman, Hattori, McLeland & Naughton, LLP

(57) ABSTRACT

Fluorine-containing water is treated by contacting the fluorine-containing water with calcium carbonate to react the fluorine in the fluorine-containing water with the calcium carbonate and fix it as calcium fluoride. After the fluorine-containing water is contacted with the calcium salt in the reaction tank to react the fluorine in the fluorine-containing water with the calcium salt and fix it as calcium fluoride, it is subjected to solid/liquid separation, and the treated water is removed while a portion of the sludge concentrated by the solid/liquid separation is returned to the reaction tank.

8 Claims, 12 Drawing Sheets

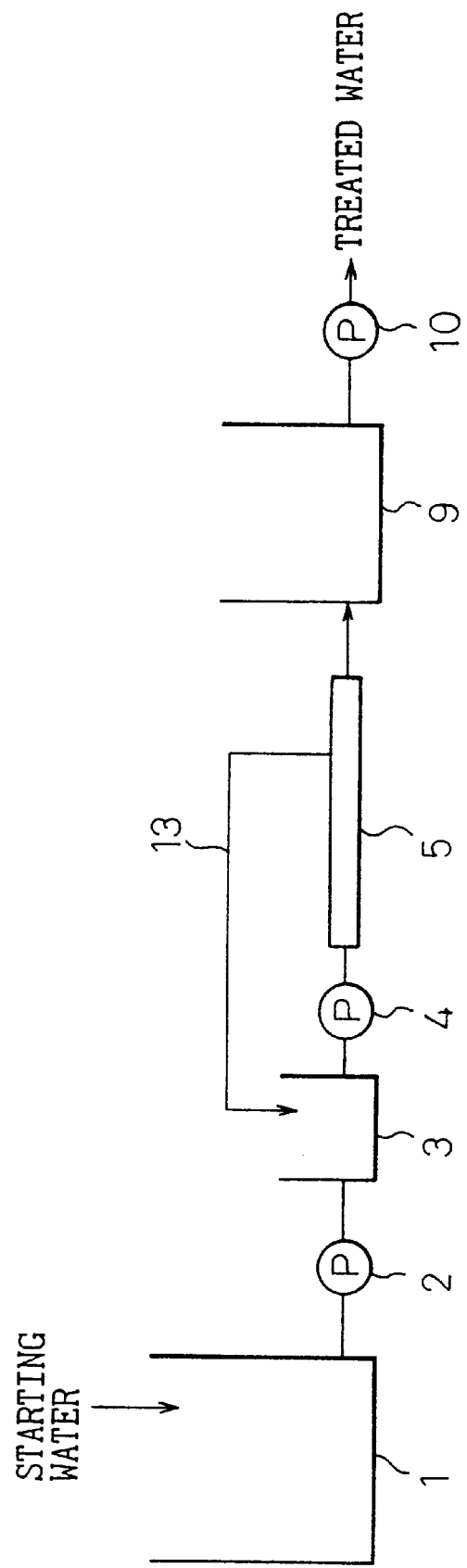

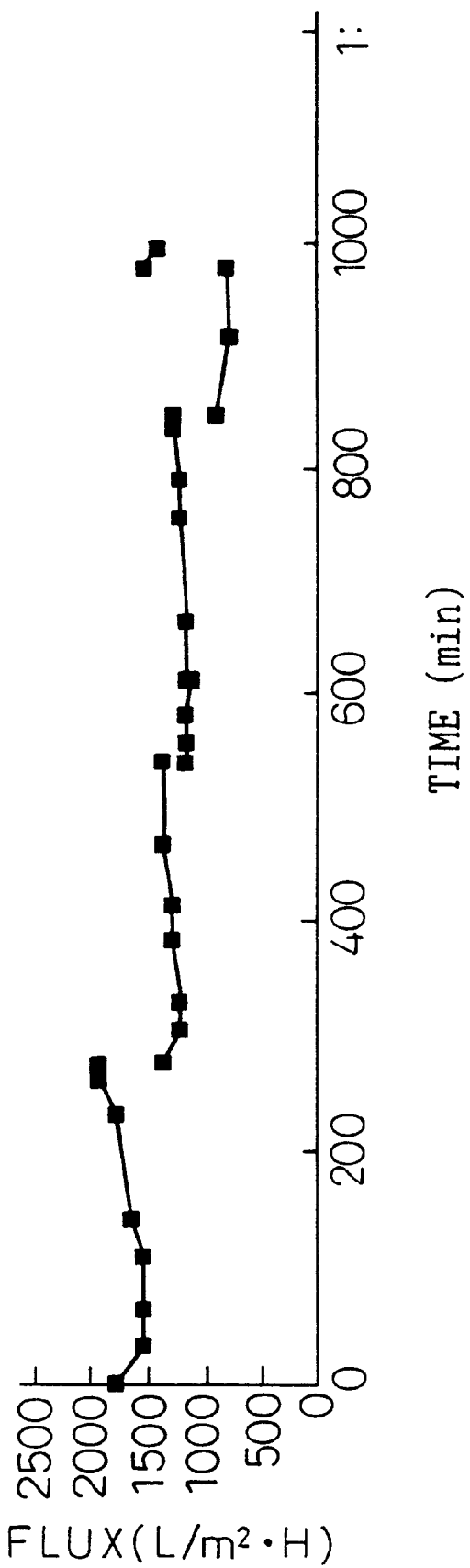

TREATMENT PROCESS FOR FLUORINE-CONTAINING WATER

BACKGROUND OF THE INVENTION

1. Field of the Invention

The present invention relates to a treatment process for fluorine-containing water. The invention particularly relates to a treatment process for removal of fluorine from fluorine-containing waste water discharged from production processes for electronic parts and the like.

The industries of semiconductor manufacturing, chemical fertilizer production, ceramics, commercial aluminum, etc. use hydrogen fluoride or include production steps which generate it, and therefore the waste water contains fluorine. The present invention establishes an effective technique, for the treatment of fluorine-containing water, from the viewpoint of reinforcing environmental measures and effectively utilizing resources which has been prevalent in recent years.

2. Description of the Related Art

Standards for discharge of various chemical substances have been established in recent years through national laws on the environment, particularly on water quality, such as the Water Pollution Prevention Act and through regional and local ordinances, which have mandated that concentrations of polluting substances in waste water must be below given standard values, and total waste water treatment is being demanded. Fluorine is one substance known to upset an ecological balance when present in high concentrations in discharged waste water, and, therefore, waste water treatment facilities for fluorine removal have become very important from an industrial standpoint.

Conventional waste water treatment for fluorine removal, such as described in Japanese Unexamined Patent Publication No. 5-253576, has involved directing the fluorine-containing water into a column packed with calcium carbonate to fix the fluorine as calcium fluoride. Specifically, as shown in FIG. 1, the fluorine-containing water is directed from a water tank 1 into a column 19 packed with calcium carbonate by a conveying pump 2, and the fluorine is converted to calcium fluoride inside the column. However, due to the phenomenon of solidification of calcium compounds in the packed column and to the channeled flow of the water, i.e. a partly unbalanced formation and the establishment of water flow channels in the packed column as shown in FIG. 2, the total amount of the calcium does not react, so that a treatment malfunction often occurs whereby breakthrough is reached before the equivalent amount has reacted. In addition, fine calcium compound particles run into the treatment water, adversely affecting the instruments and later-stage treatment equipment.

Furthermore, since hydrogen fluoride is either used or generated in production steps in semiconductor manufacture, chemical fertilizer production, ceramics, commercial aluminum and other industries, they also discharge waste water containing fluorine.

Coagulating sedimentation is generally employed whereby the fluorine-containing waste water is reacted with a calcium salt such as calcium hydroxide ($Ca(OH)_2$) to produce insoluble calcium fluoride ($CaF_2$) which fixes the fluorine, and the solid and liquid portions are then separated by gravity.

FIG. 3 shows a conventional example of this (see Japanese Unexamined Patent Publication No. 8-197070, for example). The fluorine-containing waste water is stored in a water tank 51. In a primary reaction tank 52, a calcium salt 60 such as calcium hydroxide is added to produce calcium fluoride under a pH of 6–10. An excess of the calcium salt is added to reduce the fluorine content of the waste water, and in a secondary reaction tank 53, an inorganic coagulating agent 61 comprising an aluminum, iron or other compound is added to promote the production of the insoluble calcium fluoride. An acid or alkali is added in a pH adjusting tank 54 to further promote production of the calcium fluoride at a pH of 6–8, and then an organic coagulating agent 62 comprising a partial hydrolysate of a polyacrylamide is added to a coagulating tank 55 to increase sedimentation of the product. The treated waste water is then directed to a sedimentation tank 56 and solid/liquid separation is accomplished, in the tank, by gravity.

In order to promote crystallization in the primary reaction tank 52 and secondary reaction tank 53, a method is generally employed wherein the deposited sludge 75 is returned to the primary reaction tank 52 through a conduit 13 and used as the nucleus for crystallization. A portion of the sludge separated in the sedimentation tank 56 is returned while the remainder is conveyed to a sludge reservoir 57 and dehydrated by a dehydrator 58, and the dehydrated cake 59 is treated as industrial waste.

Because the supernatant water contains insoluble calcium fluoride produced at the initial stage, it is conveyed to a later-stage treatment apparatus. The insoluble calcium fluoride which has not been deposited in the sedimentation tank 56 is removed from the storage tank 67 through a filtering column 68 packed with sand, etc. Also, for removal of the remaining fluorine in the waste water, it is treated in an adsorption column 70 packed with an adsorption agent, such as a resin spread with a metal ion such as zirconium which forms a chelate compound with fluorine ions, or active alumina. Discharge is effected after pH adjustment in a pH adjustment tank 71 in order to comply with discharge standards. In FIG. 3, 69 is a filtered water tank which functions as a filter treated water buffer and for water quality monitoring, and 72 is a storage tank which functions as a pH-adjustment treated water buffer and for water quality monitoring.

Thus, treatment of fluorine-containing waste water by conventional coagulating sedimentation requires addition of an excess of the calcium salt and addition of large quantities of coagulation agents, and this raises the cost of the treatment. In the process for improved coagulation wherein a portion of the deposited sludge in the sedimentation tank is returned to the primary reaction tank and used as the nucleus for crystallization, the coagulating agent is a factor inhibiting the crystallization. The calcium fluoride carried from the primary reaction tank reacts with the aluminum and other compounds added to the secondary reaction tank as inorganic coagulating agents, thus causing gelation and progression of crystallization. Consequently, while treatment with a calcium fluoride carrier containing no coagulating agent is more effective, addition of a coagulating agent is required because calcium fluoride is not deposited in the sedimentation tank.

In a system where the solid insoluble calcium fluoride product is separated from the liquid by gravitational sedimentation, it is impossible to avoid run-off of the insoluble calcium fluoride into the supernatant water (normally 20–50 mg/L), thus requiring later-stage filtration equipment. Sand filtration and the like are used for the later-stage filtration equipment, but this has required periodic washing operations.

Furthermore, in treatment whereby a calcium salt and coagulating agent are added to fluorine-containing waste water and the insoluble calcium fluoride salt is separated by gravity, much residual fluorine is retained in the waste water and this has required treatment in an adsorption column.

In addition, the sludge discharged from conventional treatment equipment has poor dehydrating properties because of the addition of the coagulating agent, and treatment of the dehydrated cake has necessitated much greater costs. If the calcium fluoride purity of the sludge is high it can be effectively used for purposes which offer supplementary value, for example as a material for production of hydrogen fluoride, but because of inclusion of the coagulating components in the sludge and inclusion of impurities such as $SiO_2$ in the waste water it is impossible to achieve a high purity in the neighborhood of 95%, and therefore even if it can be effectively utilized the only options are those of low supplementary value, such as bulking agents for cements.

In the sedimentation step, solid/liquid separation is accomplished by gravitational sedimentation and therefore a large volume is necessary for sedimentation, thus requiring a large space.

SUMMARY OF THE INVENTION

It is therefore an object of the present invention to solve the first problem of the prior art described above by providing a process which allows very efficient treatment of fluorine-containing water without causing solidification of calcium compounds or a channeled flow of the passing water, and without producing run-off of fine particles of a calcium compound into the treatment water.

In order to achieve this object, the present invention provides a process for treating fluorine-containing water by contacting the fluorine-containing water with calcium carbonate to react the fluorine in the fluorine-containing water with the calcium carbonate and fix it as calcium fluoride, which process comprises adding calcium carbonate particles to fluorine-containing water and circulating that mixture through a separating membrane apparatus while drawing out the fluorine-removed treated water through the separating membrane apparatus, and supplying fluorine-containing water to the circulation system for conversion of the calcium carbonate to calcium fluoride.

In order to solve the second problem of the prior art described above according to the present invention, solid/liquid separation is accomplished by filtration, centrifugation, vapor condensation, floatation or the like, instead of depending on gravitational sedimentation of the calcium fluoride produced by reaction between the fluorine in the fluorine-containing water and the calcium salt, and a portion of the concentrated sludge is returned to the reaction tank and used as the nucleus for crystallization to reduce the fluorine concentration in the fluorine-containing water.

Thus, another of the objects of the invention is, in a process for treating fluorine-containing water, to accomplish treatment with cheaper running costs involving no use of organic or inorganic coagulating agents, as well as a reduction in the moisture content of resulting calcium fluoride cakes, a wider range of purposes for effective utilization through higher purity, and minimization of the required space.

In order to achieve this object, the present invention provides a process for treating fluorine-containing water by contacting the fluorine-containing water with a calcium salt in a reaction tank to react the fluorine in the fluorine-containing water with the calcium salt and fix it as calcium fluoride, and then accomplishing solid/liquid separation and removing the treated water while returning a portion of the sludge concentrated by the solid/liquid separation to the reaction tank, which process comprises accomplishing the solid/liquid separation by a means selected from filtration, centrifugation, vapor condensation and floatation separation.

According to the present invention there is no need to use an organic or inorganic coagulating agent for treatment of the fluorine-containing water.

BRIEF DESCRIPTION OF THE DRAWINGS

FIG. 4 is a system diagram showing an embodiment of a treatment process for fluorine-containing water according to the first invention.

FIG. 13 is a graph showing the results for Example 2.

DESCRIPTION OF THE PREFERRED EMBODIMENTS

Preferred embodiments of the invention will now be explained with reference to the attached drawings.

Figure 5A:
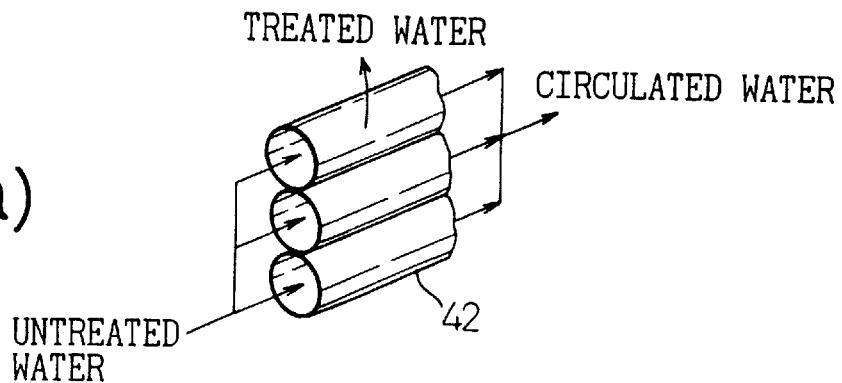
FIGS. 5(a), 5(b) and 5(c) are drawings of an embodiment of a separating membrane apparatus used in a treatment process for fluorine-containing water according to the first invention.
Figure 5B:
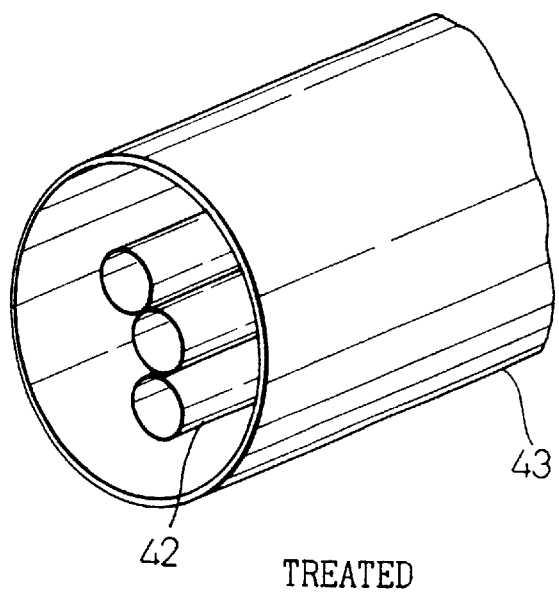
Figure 5C:
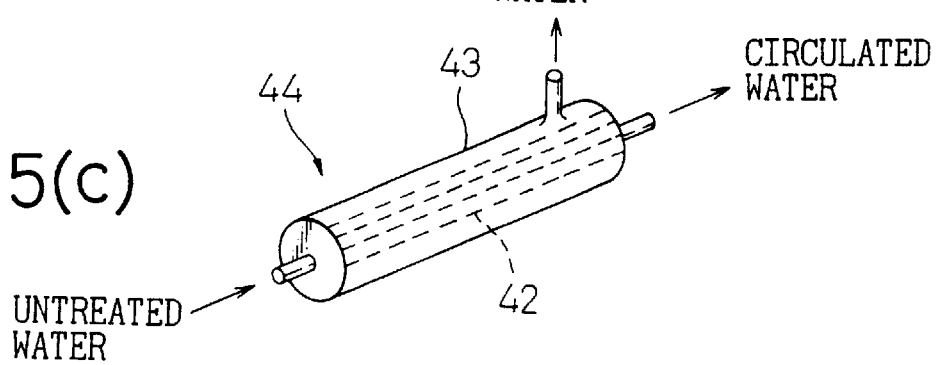

FIG. 4 is a system diagram showing an embodiment of a treatment process for fluorine-containing water according to the first invention. Calcium carbonate particles are added to fluorine-containing water as the starting water, and are present in the circulation in a circulation tank 3, separating membrane apparatus 5 and circulating conduit 13. The starting water is conveyed from the starting water tank 1 to the circulation tank 3 by a conveying pump 2, and while being circulated by a circulating pump 4 through the circulation system consisting of the circulation tank 3, separating membrane apparatus 5 and circulating conduit 13 it reacts with the calcium carbonate circulating through the circulation system, and the treated clear water is conveyed from the separating membrane apparatus 5 to a treated water tank 9 where it is discharged as treated water by a conveying pump 10. Here, conveyance of the starting water and discharge of the treated water are continued until breakthrough of the system by progression of the reaction between the fluorine and calcium carbonate. The separating membrane apparatus 5 used may be, as shown in FIGS. 5(*a*)–(*c*) for example, a crossflow-type apparatus 43 (FIG. 5(*c*)) having polyester fabric made into cylinders 42 with a diameter of about 12 cm (FIG. 5(*a*)), with 3 of the cylinders in a PVC tube 43 having an inner diameter of about 35 mm (FIG. 5(*b*)).

According to this process of the invention, the reaction between the calcium carbonate and fluorine takes place in a circulation system composed of the circulation tank 3, separating membrane apparatus 5 and circulating conduit 13 which are illustrated, where the calcium compound is circulated with the water to be treated immediately after passing through the separating membrane apparatus, and the treated clear water alone passes through the separating membrane and is conveyed to the treated water tank; consequently, there is no chance of the problem of incomplete treatment occurring due to solidification of calcium compounds and channeled flow of the water, and run-off of the calcium compound fine particles into the treated water is also drastically reduced. Furthermore, the process of the invention requires no use of coagulating agents, and therefore high purity calcium fluoride is produced during the treatment, so that the calcium fluoride can be used as a fluorine source for purposes that require high purity calcium fluoride, such as in the production of fluoric acid.

Figure 6:
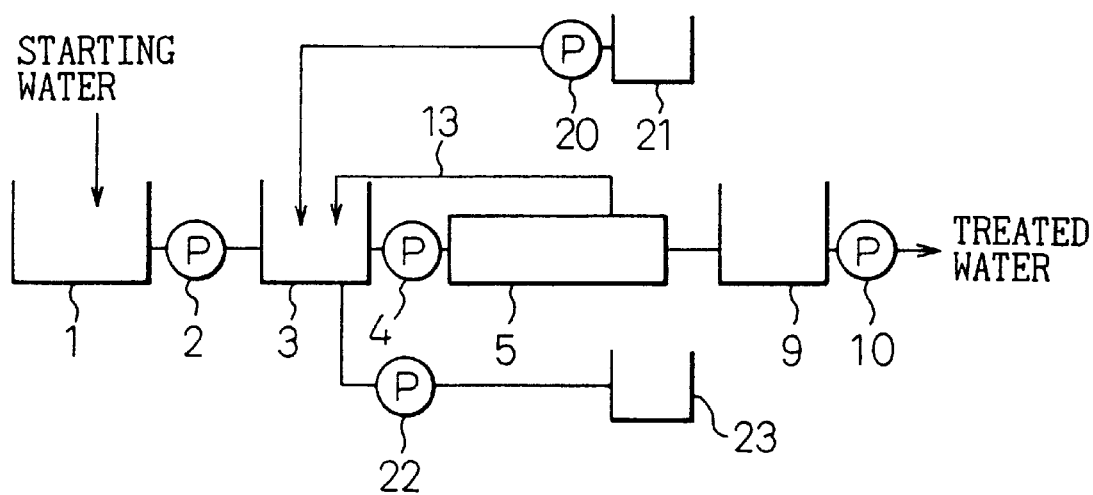
FIG. 6 is a system diagram showing another embodiment of a treatment process for fluorine-containing water according to the first invention.

When treatment of fluorine-containing water is carried out continuously in an apparatus having the structure shown in FIG. 4 which does not lead to breakthrough of the system, it may be accomplished in a manner whereby the starting water is continuously supplied from the starting water tank 1 to the circulation tank 3 by the conveying pump 2 as shown in FIG. 6, the fluorine and calcium carbonate are reacted in a circulation system comprising the circulation tank 3, separating membrane apparatus 5 and circulating conduit 13, and the treated clear water is conveyed from the separating membrane apparatus 5 to the treated water tank 9 and the treated water is continuously discharged by a conveying pump 10 as the treated water, while calcium carbonate is continuously supplied from a calcium carbonate storage tank 21 to the circulation tank 3 by a calcium carbonate supply pump 20, and the calcium fluoride is continuously drawn out from the circulation tank 3 into a calcium fluoride storage tank 23 by a calcium fluoride drawing pump 22.

Figure 7:
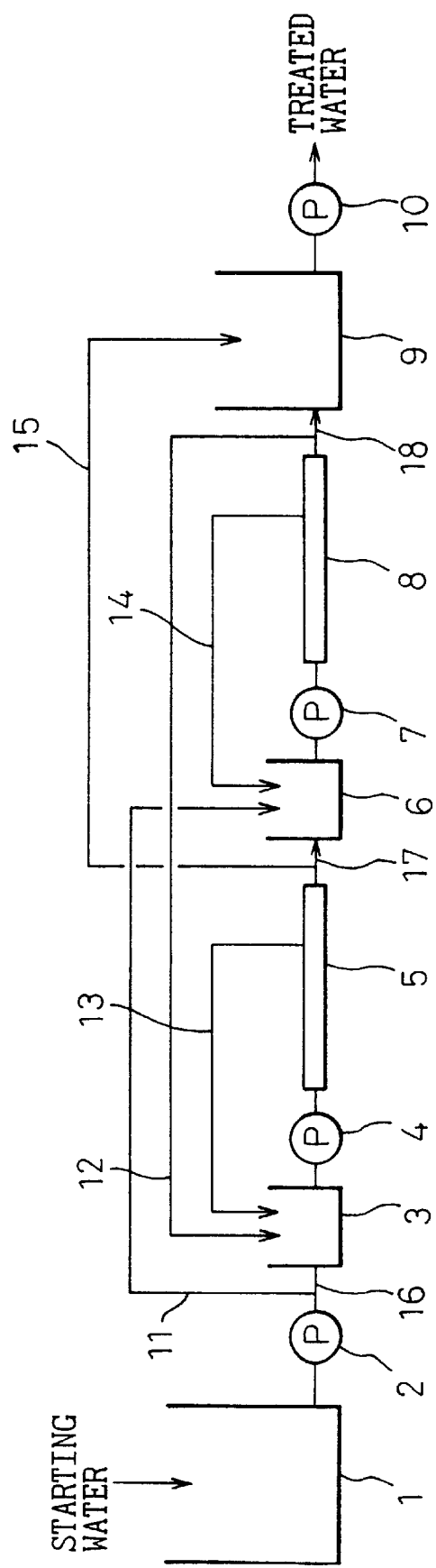
FIG. 7 is a system diagram showing still another embodiment of a treatment process for fluorine-containing water according to the first invention.

When carrying out this process of the invention, the treatment may be carried out simultaneously in a series of two, three or more circulation systems such as described above. For example, as shown in FIG. 7, the calcium carbonate particles may be added to the fluorine-containing starting water, and be present and circulating in the circulation tank 3, separating membrane apparatus 5, circulating conduit 13 and in the circulation tank 6, separating membrane apparatus 8 and circulating conduit 14. In this state, the starting water is conveyed from the starting water tank 1 to the circulation tank 3 by the conveying pump 2, and while it is circulating in the circulation system consisting of the circulation tank 3, separating membrane apparatus 5 and circulating conduit 13 by the circulating pump 4, it reacts with the calcium carbonate circulating in the circulation system and the treated clear water is conveyed from the separating membrane apparatus 5 to the circulation tank 6; also, while it is circulating in the circulation system consisting of the circulation tank 6, separating membrane apparatus 8 and circulating conduit 14 by the circulating pump 7, it again reacts with the calcium carbonate circulating in this circulation system, and the treated clear water is conveyed from the separating membrane apparatus 8 to the treated water tank 9 and discharged as treated water by the conveying pump 10. Here, the separating membrane apparatus 8 may have the same construction as the separating membrane apparatus 5 described above.

Figure 8:
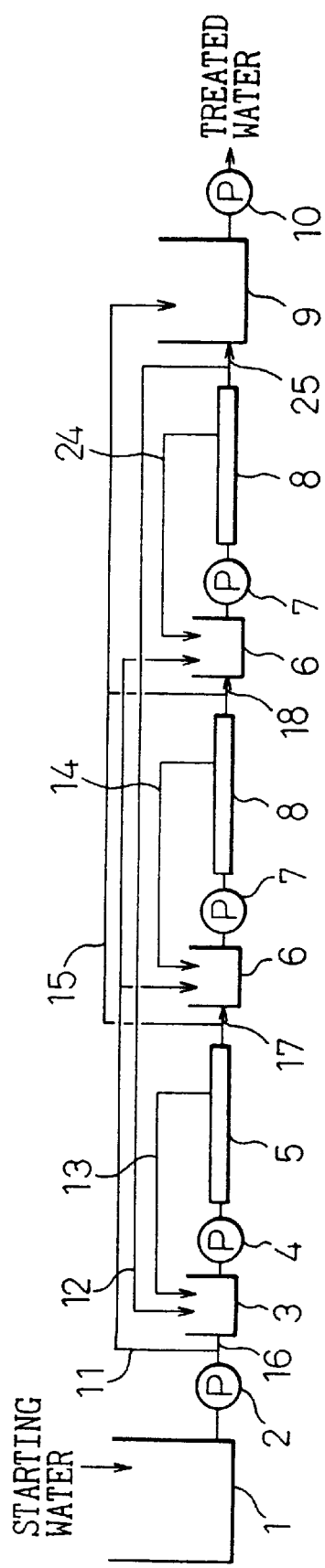
FIG. 8 is a system diagram showing still another embodiment of a treatment process for fluorine-containing water according to the first invention.

In the embodiment shown in FIG. 8, a circulation tank 6 is also situated after the separating membrane apparatus 8, and this is followed by another circulation system consisting of a circulating pump 7, separating membrane apparatus 8 and circulating conduit 24, which is further connected in a single series.

Even with an apparatus where two, three or more circulating systems are linked in series, it is possible to accomplish continuous treatment while generally maintaining constant water quality of the treated water, by appropriately situating the calcium carbonate supply system and calcium fluoride draw-out system in the manner shown in FIG. 6.

Alternatively, the apparatus embodiments shown in FIG. 7 and FIG. 8 may be used for continuous treatment in a merry-go-round fashion. As an example, in the treatment with the apparatus shown in FIG. 7, changes in the fluorine concentration of the treated water from the separating membrane apparatus 8 are monitored, and before breakthrough is reached the merry-go-round switching conduit 16 is switched to the merry-go-round switching conduit 11, the calcium compound in the first-stage circulation system consisting of the circulation tank 3, circulating pump 4, separating membrane apparatus 5 and circulating conduit 13 is replaced with freshly prepared calcium carbonate, upon which the merry-go-round switching conduit 18 is switched to the merry-go-round switching conduit 12, and the flow order of the starting water is switched from the second-stage circulation system consisting of the circulation tank 6, circulating pump 7, separating membrane apparatus 8 and circulating conduit 14 to the first-stage circulation system. By successive switching of the flow order in this manner, it is possible to accomplish continuous treatment without raising the fluorine concentration of the treated water. It will be apparent that in the apparatus shown in FIG. 8 as well, the flow order may be successively switched in the same way to allow operation in a merry-go-round fashion.

A preferred embodiment of the second invention will now be further explained.

The following explanation concerns an example of treating fluorine-containing waste water as the fluorine-containing water.

Figure 9:
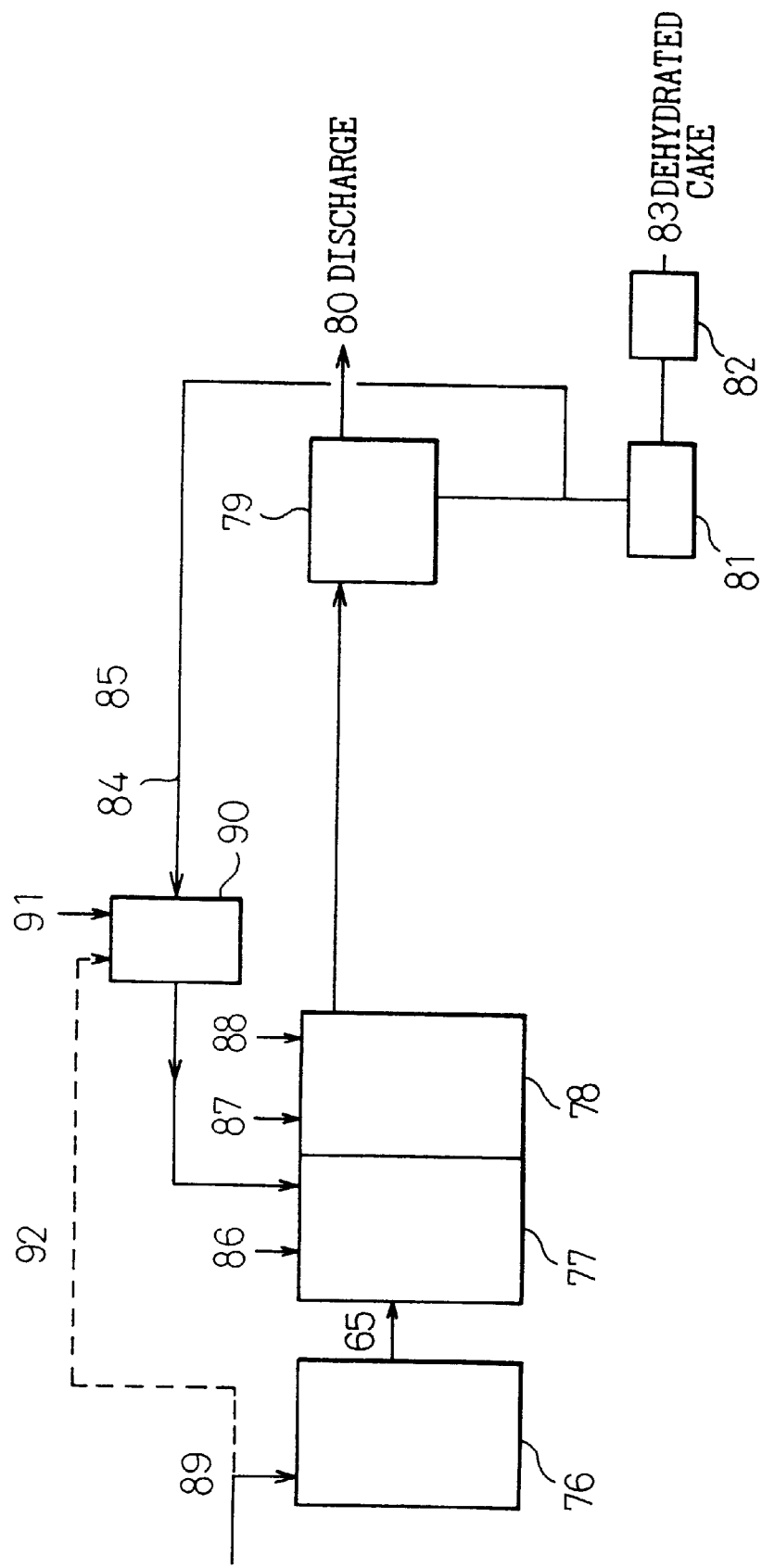
FIG. 9 is a schematic system diagram of a treatment process according to the second invention.

FIG. 9 is a schematic system diagram of a process according to the second invention. The fluorine-containing waste water is stored in a starting water tank 76. In a reaction tank 77, a calcium salt 86 such as calcium hydroxide is added and the pH of the fluorine-containing waste water is adjusted to 4–10 to produce calcium fluoride. In a pH adjusting tank 78, the pH is adjusted by adding an acid 87 or an alkali 88 to a level which promotes crystallization of the calcium fluoride, and then the waste water undergoes solid/liquid separation in a concentrating apparatus 79 and the concentrated sludge is transported to a sludge storage tank 81 and dehydrated with a dehydrator 82. A portion of the concentrated sludge is returned to the reaction tank 77 through a conduit 84 and utilized as the nucleus for crystallization of calcium fluoride in the reaction tank 77. Crystallization can be effectively promoted here by storing the returned sludge 85 and fluorine-containing waste water 92 in a storage tank 90, adding the calcium salt 91, growing calcium fluoride crystals as the nuclei for crystallization and returning the crystals to the reaction tank 77; this is particularly effective when the fluorine ion concentration of the fluorine-containing waste water 89 is low. The amount of calcium salt 91 added is preferably slightly more than an equivalent of the amount of fluorine ions in the fluorine-containing waste water 92, for example about 1.2 equivalents, and the fluorine-containing waste water 92 loaded into the storage tank 90 is preferably about 10–20% of the total amount of fluorine-containing waste water 89. Also, the amount of returned sludge is preferably about 10–40% of the total amount of generated sludge.

In the case of a low fluorine ion concentration or sludge concentration of the returned sludge, fluorine-containing waste water 89 may be added to the storage tank 90.

The concentrating apparatus 79 used is one which can function for solid/liquid separation of waste water containing calcium fluoride discharged from the reaction tank 77, and it may be based on filtration, centrifugation, vapor condensation or floatation. When solid/liquid separation is accomplished by gravitational sedimentation it is necessary for the calcium fluoride crystals to have a large specific gravity, necessitating the addition of a coagulating agent, but concentrating means based on filtration, centrifugation, vapor condensation or floatation allow the separation to be achieved without growing crystals, and therefore addition of the coagulating agent becomes unnecessary.

An example of a solid/liquid separation means by filtration is a membrane separation process. The membrane employed is an ultrafiltration (UF) membrane, microfiltration (MF) membrane, strainer or the like.

The present invention will now be explained in further detail by way of examples.

EXAMPLE 1

Fluorine-containing waste water with a fluorine concentration of 1000 mg/L and a pH of 4.0 was treated as starting water using the treatment system series shown in FIG. 7. The treatment conditions were as follows.

① Starting water tank 1 and treated water tank 9: 200 L, polyethylene material ② Conveying pump 2 and treated water pump 10: 30 L/H, magnet pump ③ Circulation tank 3 and circulation tank 6: 50 L, polyethylene material ④ Circulating pump 4 and circulating pump 7: 4 m$^3$/H, magnet pump ⑤ Separating membrane apparatus 5 and separating membrane apparatus 8: crossflow-type separating membrane apparatus (FIGS. 5(*a*)–5(*c*)), polyester membrane, filtration pressure 0.5–1.5 kg/cm$^2$, filtration flow rate 1 m/sec, circulating volume 3.4 m$^3$/H ⑥ Calcium carbonate: particle distribution 0.3–0.5 mm (31.6%), 0.2–0.3 mm (35.8%), <0.2 mm (32.6%)

The calcium carbonate circulates through the circulation tank 3, circulating pump 4, separating membrane apparatus 5, circulating conduit 13 and the circulation tank 6, circulating pump 7, separating membrane apparatus 8 and circulating conduit 14. First, the treatment was carried out by passage of the starting water through the first-stage circulation system generating gas, and causing a reaction whereby the fluorine in the starting water was fixed as calcium fluoride, and satisfactory water quality of SS≦2 mg/L was obtained without inclusion of fine particles in the treated water from the separating membrane apparatus 5. Next, when the treated water passed through the second-stage circulation system for further removal of fluorine, the treated water from the separating membrane apparatus 8 also exhibited satisfactory water quality of SS≦2 mg/L, and the fluorine concentration was very low at 5 mg/L. The recovered calcium fluoride was also of high purity.

For continuous treatment of starting water in this example, a merry-go-round system was used whereby, based on changes in the fluorine concentration in the treated water from the separating membrane apparatus 8, the calcium compound in the first-stage circulation system consisting of the circulation tank 3, circulating pump 4, separating membrane apparatus 5 and circulating conduit 13 was replaced with freshly prepared calcium carbonate, and the flow order of the starting water was switched from the second-stage circulation system consisting of the circulation tank 6, circulating pump 7, separating membrane apparatus 8 and circulating conduit 14 to the first-stage circulation system to allow continuous treatment without increase of the fluorine concentration of the treated water. In other words, treatment was accomplished with a circulation system comprising 2 systems connected in series in a merry-go-round fashion, to allow continuous and stable removal of the fluorine in the starting water.

Also, as explained for FIGS. 5(*a*) to 5(*c*), fresh calcium carbonate may be continuously supplied as the circulating calcium compound is quantitatively drawn out, thus allowing continuous and stable removal of the fluorine in the starting water even without a merry-go-round system.

Here, the calcium carbonate used for the treatment may be of any particle size and particle distribution. The separating membrane used may be a common separating membrane, or a microfiltration (MF) or ultrafiltration (UF) membrane.

As explained above, the treatment process for fluorine-containing water according to the first invention allows stable removal of fluorine without inclusion of fine particles in the treated water. It therefore provides a major contribution for industries which use fluoric acid and discharge fluorine-containing water, and for protection of the natural environment.

REFERENCE EXAMPLE 1

Reference Example 1 was carried out in the following manner to confirm the effect of the invention.

Waste water models were prepared containing 200 mg/L, 100 mg/L, 50 mg/L and 20 mg/L of fluorine ions, and upon addition of calcium hydroxide (Ca(OH)$_2$), the residual concentration of fluorine ion in the waste water was measured. The pH at this time was adjusted to the range of 6–8 with sodium hydroxide (NaOH). The results are shown in FIG. 10.

Figure 10:
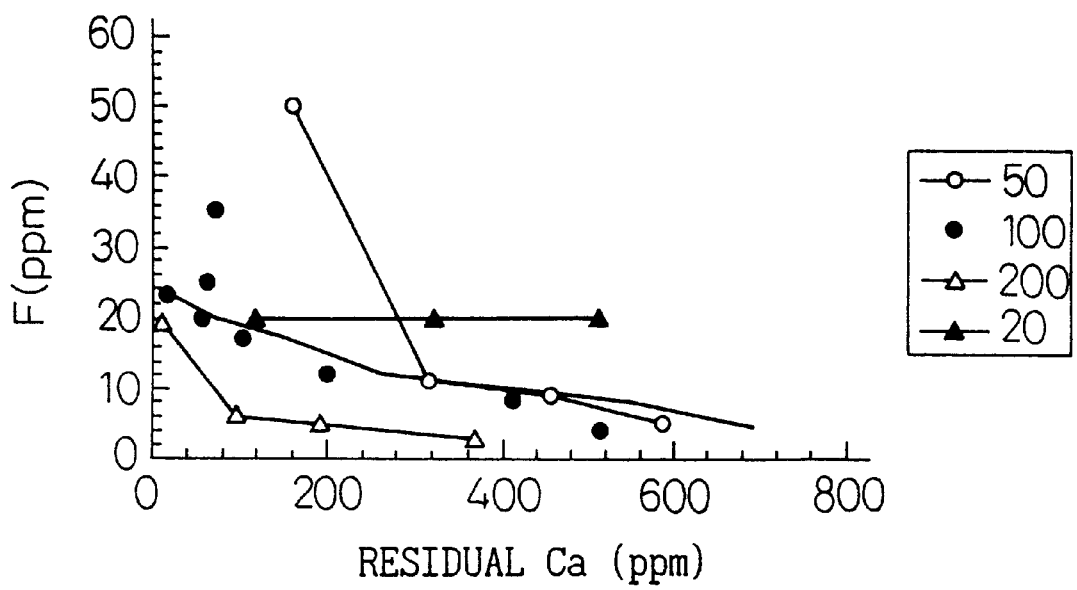
FIG. 10 is a graph showing the results for Reference Example 1.

According to FIG. 10, the waste water with a high fluorine ion concentration (200 mg/L, 100 mg/L) showed an immediate reduction in fluorine ion concentration even with a small addition of the calcium salt, indicating efficient reaction between the fluorine ion and the calcium ion produced from the added calcium salt to precipitate insoluble calcium fluoride (CaF$_2$). On the other hand, it is seen that the waste water with low fluorine ion concentration (50 mg/L, 20 mg/L) could undergo no reduction in fluorine ion concentration of the waste water without addition of an excess of the calcium salt.

While the details of the mechanism are not fully understood, it is presumed to be as follows. That is, when the fluorine ion concentration is high, the insoluble calcium fluoride precipitates even with a trace of calcium ions, and the precipitated calcium fluoride becomes a crystallization nucleus for crystallization up to a low remaining fluorine ion concentration. In contrast, it is thought that when the fluorine ion concentration is low, the initial crystallization is delayed so that fluorine ions remain in the waste water even with excess addition of the calcium salt.

REFERENCE EXAMPLE 2

The present inventors carried out Reference Example 2 to confirm the observation described above.

To a waste water model with a fluorine ion concentration of 20 mg/L and a calcium ion concentration of 320 mg/L there was slowly added a calcium fluoride-containing solution prepared with a 500 mg/L fluorine concentration and a 580 mg/L calcium concentration. The pH at this time was adjusted to the range of 6–8 with sodium hydroxide (NaOH). The results are shown in FIG. 11.

Figure 11:
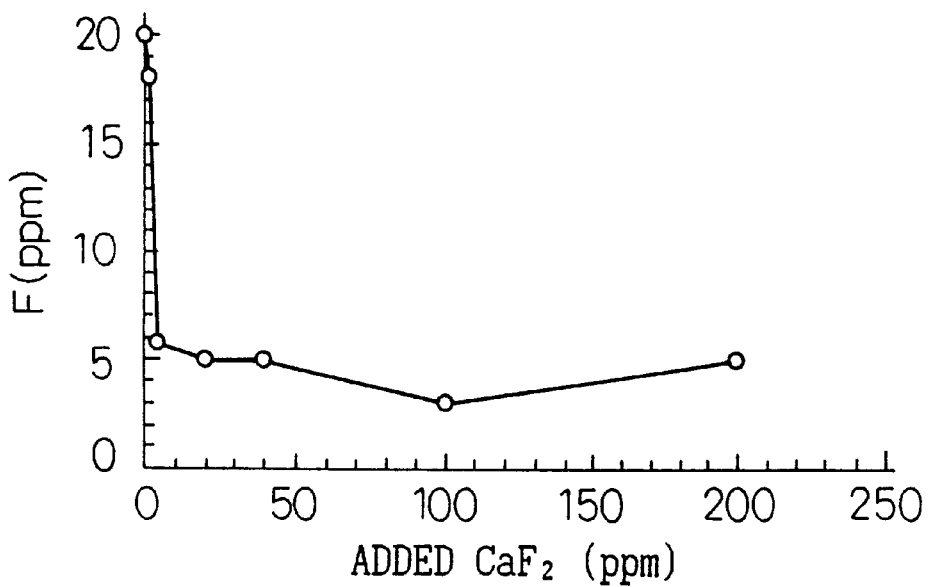
FIG. 11 is a graph showing the results for Reference Example 2.

According to FIG. 11, when the fluorine ion concentration was 20 mg/L there was no reduction in fluorine ion concentration in the waste water under the conditions in Reference Example 1, but with trace addition of calcium fluoride as a nucleus for crystallization, the fluorine ion became insoluble calcium fluoride, resulting in a reduction in the residual fluorine ion in the waste water.

Also, by comparing FIG. 10 and FIG. 11 it can be seen that a reduction in fluorine ion concentration to 5 mg/L requires a residual calcium ion concentration of 100 mg/L according to the prior art (FIG. 10) but a residual calcium ion concentration of only 20 mg/L according to the process of the invention (FIG. 11), showing that a lower amount of calcium salt can be used according to the invention.

Reference Example 1 and Reference Example 2 above are only confirmations of the principle of the invention and do not represent restrictions on the design or operating conditions for the equipment employed for the invention.

EXAMPLE 2

An apparatus such as shown in FIG. 9 was used. This example relates to one fluorine-containing water treatment process according to the invention, and the illustrated process does not limit the invention in any way.

In this example, solid/liquid separation was accomplished by filtration with a strainer. The strainer uses fibers of polyester, polyvinyl chloride, polyvinyl alcohol, polyacrylonitrile, etc. which are chemically resistant, able to withstand the heat of the operating temperature, and have mechanical strength able to withstand use. The strainer used is a fabric (twisted fiber fabric), with a weight and fiber diameter selected based on the waste water fluorine ion concentration, the concentrations of other ions and the properties of other present substances.

When using this type of strainer, insoluble calcium fluoride of a given particle size passing through the fabric results in the coarser particles primarily undergoing inertial impact and the finer particles primarily adhering to the fibers by diffusion and screening, forming particle bridges between the fibers. The primary adhesion layer formed in this manner has numerous curved pores, and a larger porosity than the porosity of the fresh strainer. Finer particles are collected by this primary adhesion layer. Also, it was confirmed that by filtering particles larger than the particle size of the normally produced insoluble calcium fluoride at the stage at which the primary adhesion layer is formed, the porosity is improved and a greater flux passes through the strainer. The large particles mentioned here may be calcium carbonate or $SiO_2$ particles which do not adversely affect the subsequent washing.

Figure 1:
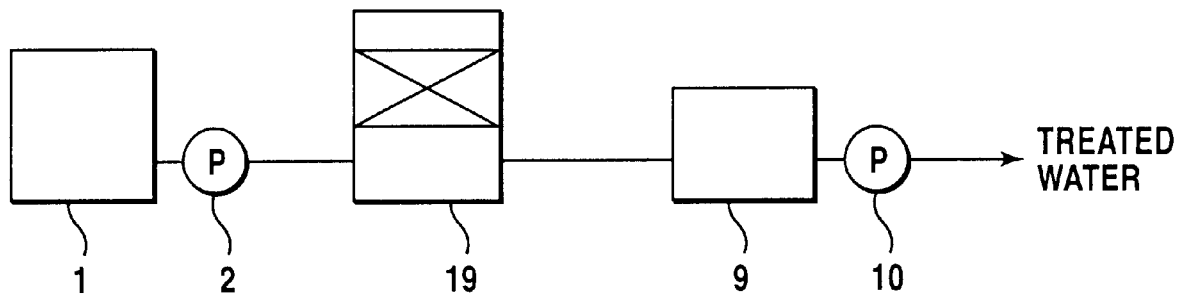
FIG. 1 is a system diagram of a conventional treatment process for fluorine-containing water for comparison with the first invention.
Figure 2:
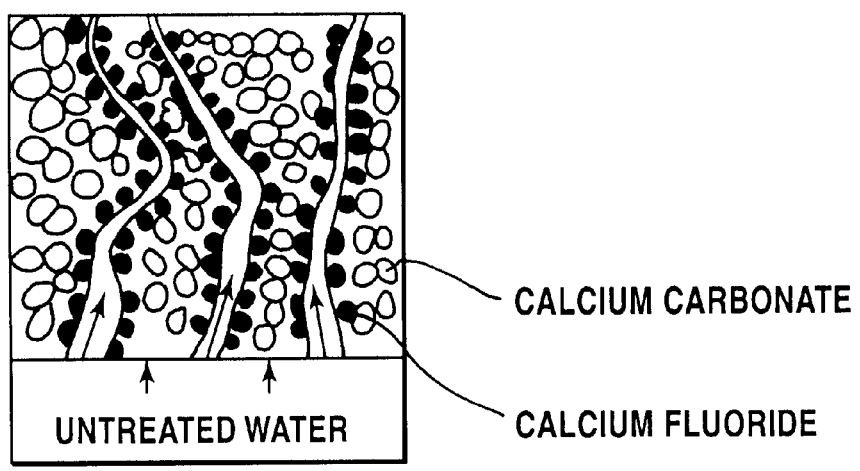
FIG. 2 is a schematic drawing of the channeled flow phenomenon of water passing through the conventional treatment process for fluorine-containing water shown in FIG. 1.
Figure 3:
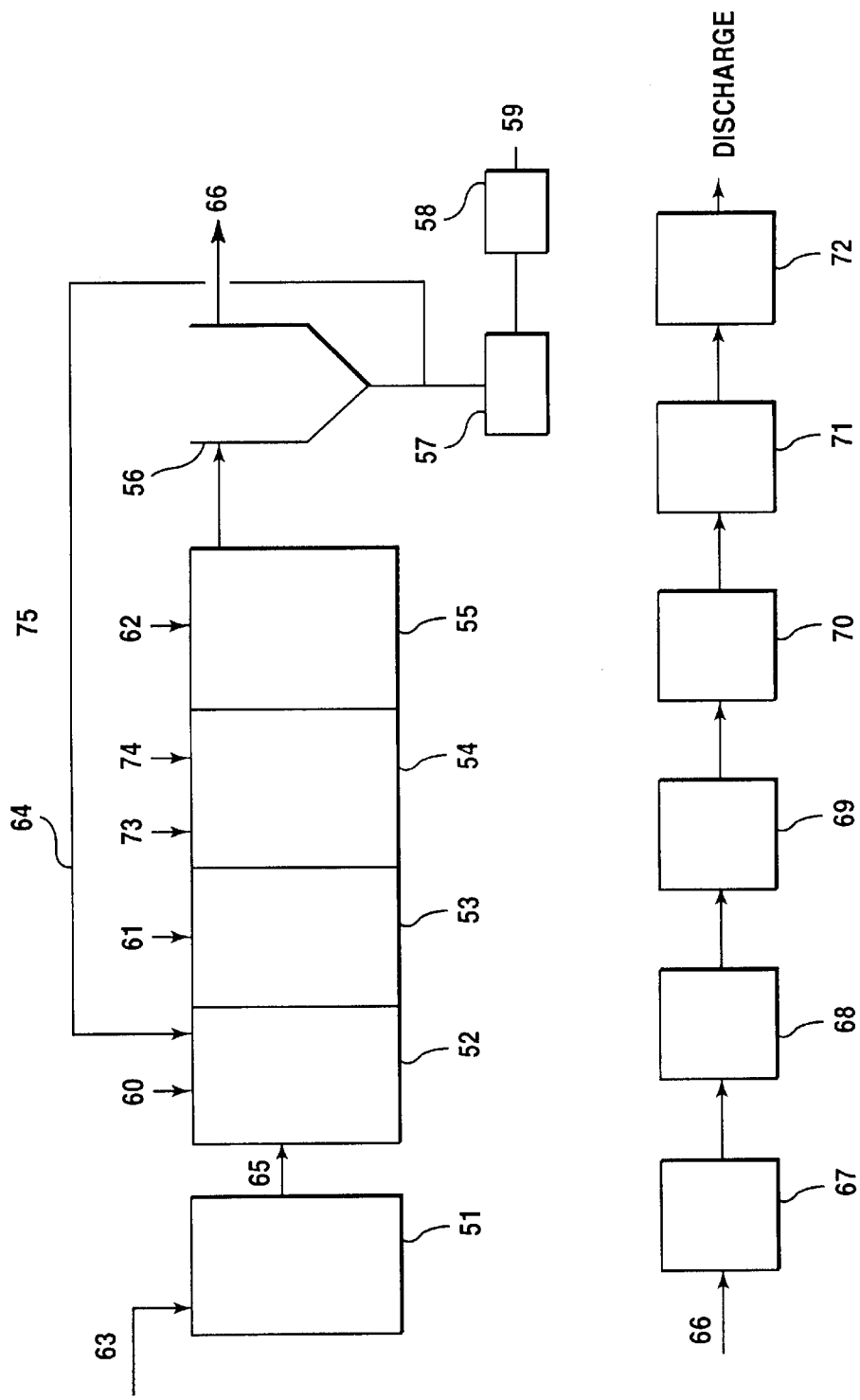
FIG. 3 is a schematic system diagram of a conventional treatment process for comparison with the second invention.

Since removal of calcium fluoride can be very effectively accomplished according to the invention in this manner, there is no need for the later-stage filtration equipment shown in FIG. 3. According to the process of the invention it is also possible to obtain high purity calcium fluoride as treatment sludge since no coagulating agent is used, and thus the sludge can be reused for purposes which require high purity calcium fluoride, such as a production material for fluoric acid.

A cylindrical or flat strainer may be utilized as the structure of the filtration column in the concentrating apparatus 79.

Figure 12A:
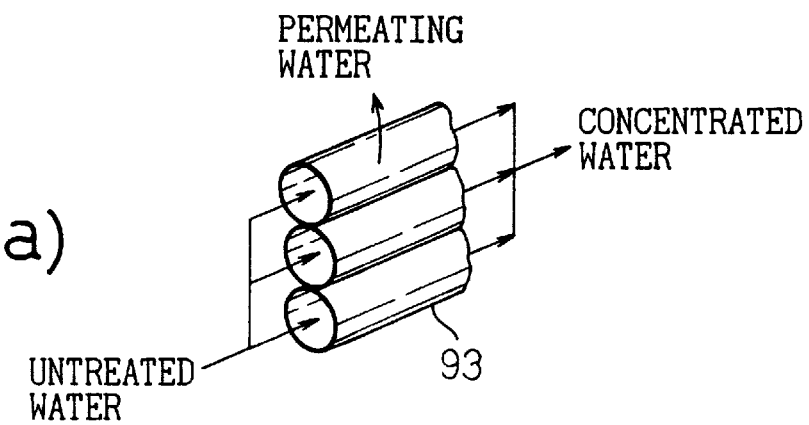
FIGS. 12(a), 12(b) and 12(c) are schematic drawings of the filtration apparatus used for Example 2.
Figure 12B:
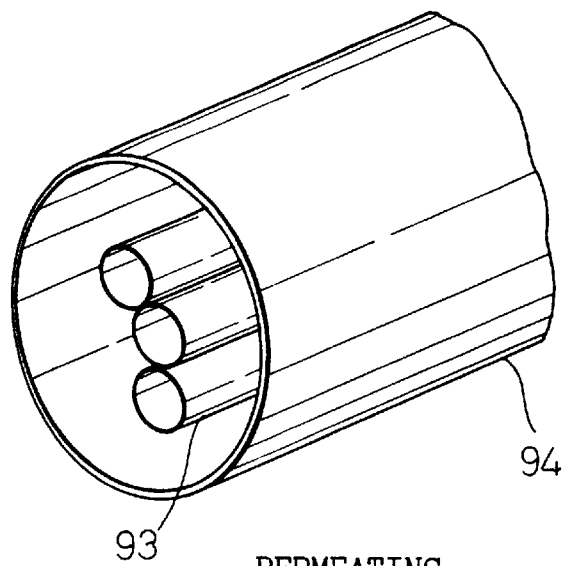
Figure 12C:
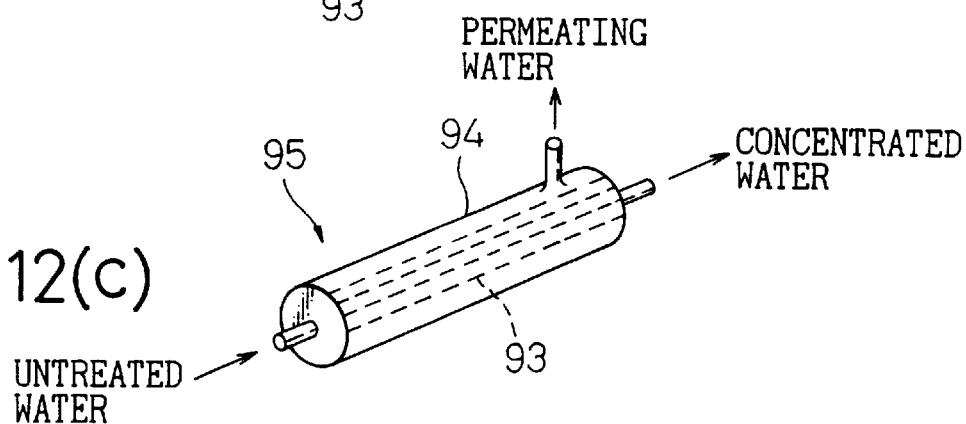

In order to confirm the filtration performance, the concentrating apparatus 79 employed was one as shown in FIGS. 12($a$) to 12($c$), i.e. a filtration apparatus 95 (FIG. 12($c$)) having a polyester fabric made into cylinders 93 with a diameter of about 12 cm (FIG. 12($a$)), with 3 of the cylinders in a PVC tube 94 having an inner diameter of about 35 mm (FIG. 12($b$)).

For the treatment, fluorine-containing waste water was provided which contained 400 mg/L of fluorine ions. Circulating operation commenced upon addition of 100 g of calcium hydroxide to 60 L of the waste water.

FIG. 13 shows the changes in flux and the flux recovery by washing. As seen in FIG. 13, the circulating operation tends to reduce the flux. This is attributed to an accumulation of insoluble calcium fluoride on the surface of the strainer, which increases the pressure loss. Recovery of the flux can be confirmed by removing the accumulated calcium fluoride on the strainer surface by washing. In this example, hydrochloric acid was used for washing, but so long as the process removes the calcium fluoride there is no limitation to the hydrochloric acid washing.

EXAMPLE 3

Figure 14:
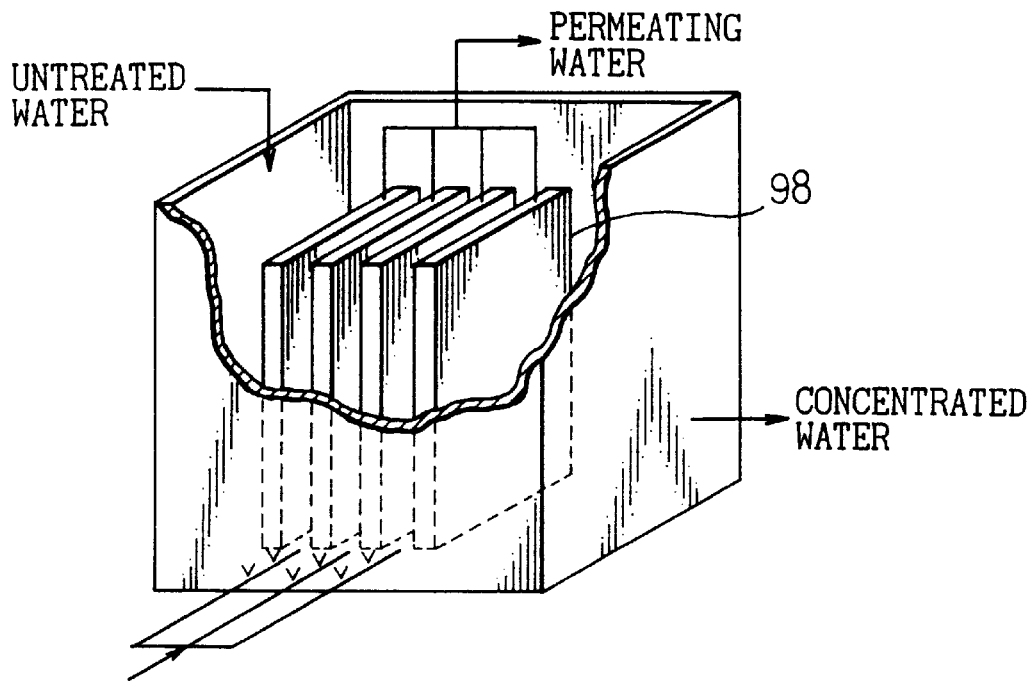
FIG. 14 is a schematic drawing of the filtration apparatus used for Example 3.
Figure 15:
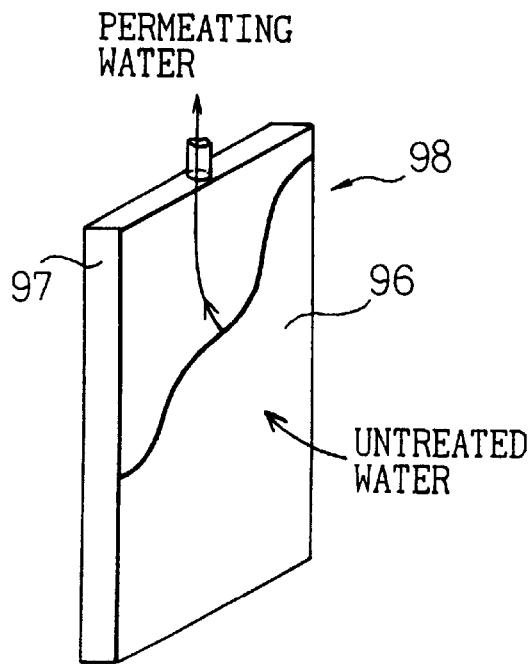
FIG. 15 is a partially enlarged view of the apparatus in FIG. 14.

Example 3 was carried out using the apparatus illustrated in FIG. 14 and FIG. 15 as the filtration apparatus in the concentrating apparatus 79. In this example MF membranes each with a pore size of 0.1 $\mu$m–100 $\mu$m were used in the filtration apparatus. Plates 98 consisting of supports 97 holding the MF membranes 96 are spaced equally apart, and bubbling is effected from the bottom as the treated waste water passes through to prevent excess calcium fluoride accumulation on the membrane surface. When the flux is reduced, the flux can be restored by chemical washing or physical removal of the accumulation.

Similar results as these can be obtained even using publicly known centrifugal separation apparatuses, vapor condensation apparatuses and floatation apparatuses with various constructions as the concentrating apparatus 79.

As described above, the treatment process for fluorine-containing water according to the second invention realizes a reduction in treatment agent use, lower sludge volume, simpler equipment, reduced space requirements and more effective utilization of fluorine by recovery of good quality calcium fluoride.

What is claimed is:

1. A process for treating fluorine-containing water by contacting the fluorine-containing water with calcium carbonate to react fluorine in the fluorine-containing water with the calcium carbonate and fix it as calcium fluoride, the process consisting essentially of the steps of:

circulating the fluorine-containing water containing the calcium carbonate without stagnating through a circulation system comprising a circulation tank, a separating membrane apparatus and a circulation conduit so the fluorine and the calcium carbonate react to form calcium fluoride and the separating membrane separates the resulting fluorine-removed treated water from remaining fluorine-containing water containing remaining calcium carbonate, supplying untreated fluorine-containing water to the circulation tank, while removing the fluorine-removed treated water by passing the fluorine-containing water containing the calcium carbonate through the separating membrane and recirculating the remaining fluorine-containing water containing the remaining calcium carbonate back to the circulation tank from the separating membrane through the circulation conduit, and continuing the circulation of fluorine-containing water containing calcium carbonate, the supply of untreated fluorine-containing water, the removal of the fluorine-removed treated water and the recirculation of the remaining fluorine-containing water, thereby converting calcium carbonate to calcium fluoride and producing fluorine-removed treated water.

2. The process of claim 1, wherein said separating membrane apparatus is a crossflow-type separating membrane apparatus.

3. The process of claim 1, wherein the calcium carbonate is almost totally converted to calcium fluoride, and the calcium fluoride is reused as a fluorine source.

4. The process of claim 1, wherein the circulation system comprises a plurality of units for circulating the mixture through a separating membrane apparatus.

5. A process for treating fluorine-containing water consisting essentially of:

contacting the fluorine-containing water with a calcium salt in a reaction tank to react the fluorine in the fluorine-containing water with the calcium salt and fix it as calcium fluoride, performing solid/liquid separation and removing the treated water, said solid/liquid separation being performed by a means selected from filtration separation by a means selected from filtration, centrifugation, vapor condensation and floatation separation, and returning a portion of the sludge concentrated by said solid/liquid separation to said reaction tank while adding the calcium salt to the sludge.

6. The process of claim 5, wherein the fluorine-containing water is contacted with the calcium salt in the reaction tank without the presence of an organic or inorganic coagulating agent.

7. The process of claim 5, wherein the pH is adjusted after the reaction and before solid/liquid separation.

8. The process of claim 5, wherein the amount of returned sludge is about 10–40% of the total amount of generated sludge.

* * * * *